United States Patent [19]

Stern et al.

[11] Patent Number: 5,587,102
[45] Date of Patent: Dec. 24, 1996

[54] MAGNETIC PAINT COMPOSITION AND METHOD

[75] Inventors: Donald J. Stern, Bellingham, Wash.; Dan Treleaven, Delta, Canada

[73] Assignee: DJS&T Limited Partnership, Bellingham, Wash.

[21] Appl. No.: 296,351

[22] Filed: Aug. 25, 1994

[51] Int. Cl.$^6$ ........................................ C09D 5/23
[52] U.S. Cl. ................ 252/62.54; 427/131; 427/128; 427/421; 252/62.55
[58] Field of Search .................... 427/131, 128, 427/421; 252/62.51, 62.54, 62.55

[56] References Cited

U.S. PATENT DOCUMENTS 3,503,882  3/1970  Fitch .................................. 252/62.54
3,766,074  10/1973  Brouillette ......................... 252/62.54

*Primary Examiner*—Melissa Bonner
*Attorney, Agent, or Firm*—Hughes, Multer & Schacht, P.S.

[57] ABSTRACT

A magnetic paint composition comprising a carrier, particulate magnetically permeable material, a binder, and a thickening agent having thixotropic and viscosity characteristics such that the paint composition has high viscosity when stationary, and low viscosity when shear forces to the paint composition, as it is being applied to a wall surface. When the paint is dried, magnetic objects can be mounted to the wall surface and held in place by the interaction by the magnetically permeable material.

9 Claims, No Drawings

MAGNETIC PAINT COMPOSITION AND METHOD

BACKGROUND OF THE INVENTION a. Field of the Invention

The present invention relates to a paint composition and method of making and applying the same, wherein the paint composition comprises magnetically permeable particulate material which, with the paint composition being applied to a wall surface and dried, is able to coact with small magnetic objects to hold such objects to said wall surface.

b. Background Art

It has long been a practice to provide small magnets with various indicia or decorative patterns or items attached thereto, and these magnets are then placed against a magnetically permeable planar member (e.g. made of an iron alloy) so that these could be viewed. For example, these magnets may be placed against the metal door of a refrigerator with a piece of paper being placed between the magnet and the refrigerator door to hold a sheet of paper with information thereon in a position where it can easily be viewed. Also, such a magnet can have simply a decorative function or indicia of some sort placed there for viewing, and this is mounted magnetically to some metal surface.

If it is desired to mount such magnetic objects to a wall location where there is no magnetically permeable material, one means of accomplishing this is simply to attach a sheet of magnetically permeable metal against the wall surface. Then the magnetic objects can be mounted magnetically to the magnetically permeable sheet.

U.S. Pat. No. 3,503,882 (Fitch) discloses a paint composition containing iron powder which is to be applied to surfaces so that magnetic objects can be placed against the surface to which the paint has been applied. The particular composition disclosed in this patent is a mixture of iron powder and an epoxy ester resin with an emulsifiable polyethylene wax and organophilic alkyl ammonium bentonite dispersed in a paint hydrocarbon solvent.

Also disclosed in this patent as prior art is a method of first applying a coat of paint to a panel, dusting the wet paint with iron powder and then, when the paint is dry, applying another coat of paint over the layer of iron powder.

SUMMARY OF THE INVENTION

It is an object of the present invention to provide a paint composition having particulate magnetically permeable material therein which can be stored for extended periods of time while maintaining the particulate material in suspension, but which can easily and conventionally be applied to a wall surface much in the manner of a conventional paint. More specifically, in the stored position, the paint has a relatively high viscosity which substantially alleviates the problem of the particulate material settling in the composition. Yet when it is applied to a wall surface the viscosity is reduced substantially so that it has the consistency and other characteristics of conventional paint.

It is also an object of the present invention to provide such a composition where rust or other degradation of the paint itself and the magnetically permeable particles is avoided not only during storage of the paint, but also when the paint (having been applied as a coating to a wall surface) is protected from further rust and other deterioration.

It is also an object to provide this as a waterbase paint composition that can be cleaned with water or with water and soap.

DESCRIPTION OF THE PREFERRED EMBODIMENT

In the following description, there will first a presentation of the ingredients of the paint composition of the present invention and the characteristics of the same. This will be followed by a description of the process of preparing the paint composition, and then a description of its application to wall surface and subsequent use.

The main ingredients of the paint composition are the following.

a. Particulate iron (The major ingredient of the paint composition of the present invention is particulate iron which is magnetically permeable and thus imparts to the paint composition the capability of holding magnetic objects to the wall or other substrate to which the paint is applied.)

b. Water (This is the carrier)

c. A thickening agent with the proper thixotropic and viscosity characteristics. (This is particularly significant in the present invention and will be discussed more fully later herein).

d. A rust inhibitor e. A hygroscopic drying control agent to control the rate of drying of the paint composition f. One or more surfactants g. An anti-microbial and anti-fungal agent h. A defoamer i. A binder (in the preferred form of a vinyl acrylic co-polymer j. Aqua ammonia (28%) (to adjust the pH)

The iron is particulate iron of a relatively small particle size. Desirably, substantially all of the iron particle will pass a No. 100 screen, and at least 99% passes a No. 200 screen. As to the minimum particle size most all of the particles (e.g. 99%) will be retained on a No. 325 screen (U.S. standard. This material is further referenced as CAS Number 65997-19-5, by which it can be further identified. Also, the iron should be relatively pure (exceeding 95 to 96 percentage of iron). If the particle size is too great, then the paint composition has a coarse appearance, and the iron particles are more prone not to remain suspended in the paint composition. On the other hand, if the iron particles are too fine, they tend to make the composition more paste-like so that it is difficult to spread as a paint. This pastiness can be alleviated by reducing the percentage of iron particles. However, this reduces its magnetic holding ability.

The particular type of particulate iron which has been found to be suitable for the present invention is iron dust that is manufactured by Peerless Metal Powder, Inc. of Detroit, Mich. under the brand designation "T4" dust. This can be, for example, iron particles (or iron dust) which is collected from grinding operations.

The water used in this paint composition serves the usual function of a waterbase paint, and acts as a liquid carrier which evaporates when the paint is applied to a substrate. The water should be reasonably pure, and not highly mineralized.

The thickening agent is (as indicated previously), significant in the present invention. A preferred thickening agent is a synthetic smectite clay, which is sold under the mark "LAPONITE RDS", and made by Southern Clay Products of Gonzales, Texas. The formulation for this thickener is as follows:

| | |
|---|---|
| Silicone dioxide | 54.5% |
| Magnesium oxide | 25% |
| Lithium oxide | 6.8% |
| Sodium oxide | 5.6% |
| Phosphorus pentoxide | |

The loss on ignition value of the Laponite RDS is listed as being 8%, this being a standard test where the compound is first dehydrated and then brought to a temperature of 950° C. for one hour. In a sieve analysis of this compound, 98% of the compound is less than 250 micron. The surface area is listed as being 330 square meters per gram.

The desired characteristic contributed by this particular type of thickening agent is that it contributes quite desirable thixotropic and viscosity qualities to the paint composition. The composition has high viscosity at low shear rates, and low viscosity at high shear rates. Thus, when the paint composition is simply being stored, it is quite viscous and is able to maintain the iron particles in suspension for prolonged periods. On the other hand, when the paint composition is spread on a wall surface, there is a shearing action imparted to the composition, and due to the thixotropic characteristic of the composition, its viscosity drops substantially, thus enabling it to be properly spread over the wall surface much in the manner of conventional paint.

In the preferred formulation of the composition of the present invention, the viscosity is about 85 KU (Krebb Units), as measured in a standard test procedure using the Stormer Viscometer. When lesser amounts of Laponite RDS were used so as to reduce the viscosity, there was a greater tendency for the iron particles to settle toward the bottom of the paint composition when stored. On the other hand, when the viscosity was increased over the desired level, the paint composition became more difficult to spread on the wall surface. Experimentation indicates that the lower viscosity range should be at least as high as 75 to 80 KU, and more preferably as high as 83 KU. On the high side, an approximate upper limit where the viscosity became undesirably high so as to make the paint composition difficult to spread would be a viscosity level of about 90–95 KU, and a more preferred upper limit would be approximately 88 KU. A preferred value was found to be (as indicated above) of 85 KU, using the Stormer Viscometer. This provided a proper balance in achieving the two goals: a) having sufficiently high viscosities to minimize the settling of the iron particles when the paint compositions is simply being stored; b) making the paint composition easy to apply to the wall surface.

Other candidates for the thickener are as follows. Cellulosic compositions could be used. One such composition is hydroxy ethyl cellulose, which is identified by the acronym "HEC". Another is ethyl hydroxy ethyl cellulose, which is identified by the acronym "EHEC". These are sold under the trademark "BERMOCOL" and sold by Berol Nobel.

Other candidates for the thickening agent are emulsions, based on acrylic polymers. One such emulsion is sold under the mark "ACRYSOL", and made by Rohm and Haas.

If these other such thickeners are used, it is to be understood that these should be added in quantities and in a manner to exhibit the desirable thixotropic and viscosity characteristics as described above relative to the Laponite RDS. There are other techniques for measuring the viscosity, in addition to the use of the standard test procedure used of the Stormer Viscometer, and there are conversion tables where the values obtained by the other testing can be generally correlated to the Krebb Unit values given by the Stormer Viscometer. While there is a certain amount of latitude or tolerance inherent in such measurements, these conversions from one set of units to another generally correspond within a reasonable tolerance with one another. The rust inhibitor used in the preferred formulation is sodium benzoate. The sodium benzoate initially functions in the paint composition to prevent the iron particles rusting while the paint is stored before application. When the paint is then applied to the wall surface, and the water evaporates the sodium benzoate remains dispersed throughout the paint composition which is then dry. As will be disclosed hereinafter, subsequent to application and drying of the paint composition of the present invention, for aesthetics or other reasons, there will often be a second coating of paint, and this may well be a waterbase paint. It has been found that the application of the second coat of waterbase paint results in the water from the second coat of paint migrating into the first coat of paint of the present invention, and there is a tendency to cause the iron particles to flash rust. It has been found, however, that by incorporating a sufficient amount of the rust inhibitor (sodium benzoate), this flash rust can be prevented. Other candidates for the rust inhibitor are sodium nitrite.

The hygroscopic drying control agent is in the preferred composition hexylene glycol. This substance absorbs and to some extent retains the water in the paint composition, so that it is released in a controlled manner so that the paint composition does not dry too quickly. The amount of hexylene glycol added to the paint composition of the present invention dries somewhat more slowly than is usual for paint compositions in general. It has been found that this aids in the proper application of this paint composition so that as overlapping portions of paint are applied on sequential brush strokes, these properly blend in with one another. Other possible drying control agents are ethylene glycol or propylene glycol.

The surfactant component can compromise conventional surfactants that are commonly used in paint compositions. The two which have been selected for use in the present composition in the preferred form are as follows. One is identified by the mark "COLLOIDS 111". A second is "SURFYNOL 104" (mixed with ethylene glycol). The Surfynol 104 also functions as a defoaming agent.

The anti-microbial and anti-fungal ingredient used in the present composition is sold under the mark "OXIBANA" and is one of a number of such agents conventionally used for this purpose.

The defoamer for the present composition also can be conventional, and one such defoamer is sold under the mark "COLLOIDS 648", this particular defoamer comprising mineral oil containing ultra-fine silica.

The binder used in the present composition also can be conventional, and in the preferred form of the present invention this binder comprises vinyl acrylic co-polymers. The specific binder used in the present composition is sold under the mark "WALLPOL DX-101".

The ammonia is added to the composition to adjust the pH, and this can be ammonia dissolved in water at a concentration of 28% ammonia.

The preferred formulation for the present invention and the method of mixing the same will now be presented. The quantities given are in liters, and also in kilograms. The quantities given are for the making a one thousand liter batch of the paint composition. It is to be understood, of course, that this is simply by way of example and the composition could be made in other batch quantities.

The first step is to make a premix of part of the water in the end composition and also the thickening agent "Laponite RDS". The quantities of those for the premix are as follows:

|  | Liters | Kilos |
|---|---|---|
| Water | 40.364 | 40.36 |
| Laponite RDS | 1.794 | 4.49 |

The quantities of the other ingredients are as follows:

|  | Liters | Kilos |
|---|---|---|
| Water | 126.474 | 126.47 |
| Sodium Benzoate | 17.631 | 25.65 |
| Hexylene Glycol | 32.886 | 30.29 |
| Colloids 111 | 11.993 | 13.19 |
| Surfynol 104 | 28.951 | 28.60 |
| Oxaban A | 1.638 | 1.61 |
| Colloids 648 | 3.255 | 2.75 |
| Wallpol DX-101 | 522.235 | 558.79 |
| Iron Dust | 206.582 | 1590.68 |
| Aqua ammonia (28%) | 6.168 | 5.55 |

The method of making the paint composition is as follows.

To prepare the premix of water and the thickener (Laponite RDS), these are mixed together in a separate mixer and at a relatively slow rate for about thirty minutes until the Laponite RDS is thoroughly hydrated. During the thirty minutes that the quantity of the water and the Laponite RDS is being mixed, the main mix is prepared in a separate mixer. This separate mixer can be, for example, a large stainless steel container (e.g. having a 900 liter capacity) and with the mixing being accomplished by a disperser blade rotating about at a relatively slow rate (e.g. 200 to 300 revolutions per minute).

The second quantity of water (126½ liters) is placed in the main mixer, and then the sodium benzoate is added. Next, the hexylene glycol is added, and after this the Colloids 111, the Surfynol 104 (mixed 50—50 with ethylene glycol), the Oxiban A and Colloids 648.

Next, the Wallpol DX-101 (the binder) is added. Then the iron particles are added. The iron particles are fed into the container at a controlled rate so that these can properly be mixed into the components already in the container in a controlled manner.

Finally, the ammonia (in solution with water at a concentration of 28% ammonia) is added to the batch.

The final step is then to take the premix (the 40,364 of water with the 1.794 liters of Laponite RDS, which has been mixing for about a half an hour) and to add this premix to the second larger batch. Strong agitation is needed at this stage and can be achieved by rotating the mixing blade at 500 to 600 RPM. These are mixed together for about two to three minutes at this higher speed, and then at a lower speed (e.g. 300 RPM) for about ten minutes. The precise amount of the pre-mix may be varied depending upon the desired viscosity.

Then the paint composition-is removed from the mixer and placed in suitable containers (e.g. individual paint cans) and is ready for storage and subsequent use by the consumer.

When the paint is stored in the container for a period of time, the relatively high viscosity of the paint composition (when it is undisturbed) keeps the iron particles suspended in the composition. In its stored condition, the thixotropic character provided by the thickening agent maintains the paint composition more in the form of a gel, as opposed to a liquid. For example, if a solid glass spherical marble of about ½ inch diameter is placed on top of the composition, it will simply remain resting on the top surface of the composition, and will not sink, as it would with a normal paint composition.

When the paint composition is to be applied to a wall surface, this can be done in a conventional manner. Conventional paint applicators, such as a brush or a sponge applicator, could be used. Initially, the paint composition is stirred sufficiently so that this changes the character of the composition to more of a liquid (as opposed to a gel), and the applicator (a paint brush) is dipped into the paint, and then placed against and moved over the wall surface to spread the paint. This obviously imparts a shearing action to the paint where the adjacent layers of paint slide against one another. As indicated previously, this substantially reduces the viscosity of the paint for a short period of time to substantially decrease the viscosity and the paint can be spread in a layer over the wall surface, much in the manner of a conventional paint composition.

After the paint composition is applied to the wall surface and has dried, the iron particles remain distributed substantially uniformly throughout the coat of dried paint. Further, with the water having largely evaporated from the paint composition, the sodium benzoate remains in the composition and is also distributed throughout the dried coat of paint.

Quite often, a second coat of paint may be applied over the first coat of paint of the present invention. On the assumption that this second coat is a waterbase paint, it has been found that there is a tendency for the water in the second coat to migrate into the first coat containing the iron particles. It has been found that an adequate amount of the rust inhibitor (sodium benzoate) distributed throughout the coat of paint of the present invention is able to inhibit the rust forming on the iron particles. Experimentation has indicated that if sodium benzoate in the amount of one half percent by weight, relative to the total amount of iron particles, is added to the composition during formulation, this will substantially inhibit the formation of rust during the period of time that the paint is stored. It has been further found that in order to inhibit formation of rust after the paint has dried and a second coat of another type of paint is added, a greater amount of the sodium benzoate is desirable. In the preferred formulation given above, there is by weight 25.65 parts of sodium benzoate to 1590.68 parts of particulate iron, which is a ratio of about one to sixty one. Present experimentation indicates that this has been found adequate to inhibit the later formation of rust on the iron particles after the coating of paint has dried, and the second coat is applied. Also, if the paint composition of the present invention is applied to a wall and is exposed to a high humidity environment, the sodium benzoate inhibits the formation of rust.

After the application of the coat (or coats) of the paint is completed, the iron particles in the paint are present in sufficient quantity and in sufficiently close proximity with one another so as to provide a magnetically permeable layer over the wall so that magnetic objects can be placed against the coating of paint on the wall surface and remains mounted to the wall. It has been found that application of one coat of paint to a wall surface is generally adequate to hold the smaller magnetic objects that are commonly applied to a wall surface. However, it is to be understood that additional applications of the paint composition of the present invention could be applied if a greater thickness is desired to increase its magnetic holding properties.

What is claimed:

1. A paint composition comprising:

a. water;

b. a binder;

c. a particulate magnetically permeable material, comprising iron particles, distributed in the composition;

d. a thickening agent having thixotropic and viscosity characteristic such that the composition has higher viscosity when subjected to substantially no shear movement and lower viscosity when the composition is subjected to movement having high shear rate;

e. a rust inhibitor that is characterized in that with the paint in its stored condition before application, the rust inhibitor prevents rust caused by water in the composition, and is further characterized in that after application and drying of the paint composition, the rust inhibitor remains distributed throughout the dried paint composition in a manner that at such time as a second coat of waterbase paint is applied, with water from the second coat migrating into the dried paint, the rust inhibitor in the dried paint is positioned to prevent rust occurring by the water in the second coat having migrated into the previously applied paint composition; whereby when the composition is being stored, its high-viscosity maintains the particulate material suspended in the composition and the rust inhibitor prevents rust in the particulate material, when the paint composition is applied to a wall surface, it is subjected to high shear rates to lower the viscosity and cause its easy application, and when the paint composition is dried and a second coat of waterbase paint is applied over the dried paint composition, with water from the second coat migrating into the dried paint composition the dried paint composition remains intact and rust is prevented.

2. The paint composition as recited in claim 1, wherein said thickener is a synthetic smectite clay.

3. The composition as recited in claim 1, wherein rust inhibitor is sodium benzoate.

4. The composition as recited in claim 1, wherein said binder comprises vinyl acrylic co-polymers and said thickening agent is selected from the groups consisting of synthetic smectite clay, cellulose compositions, acrylic polymers and combinations thereof.

5. The paint composition as recited in claim 4, wherein said rust inhibitor is selected from a group consisting of sodium benzoate and sodium nitrate.

6. The composition as recited in claim 1, wherein said rust inhibitor is selected from a group consisting of sodium benzoate and sodium nitrate.

7. The method of applying a magnetically permeable paint composition to a wall surface to enable magnetic objects to be mounted to said wall surface, said method compositing:

a. providing a paint composition comprising:
   i. water;
   ii. a binder;
   iii. a particulate magnetically permeable material, compromising iron, distributed in the composition;
   iv. a thickening agent having thixotropic and viscosity characteristic such that the composition has high viscosity when subjected to substantially no shear movement and low viscosity when the composition is subjected to movement having high shear rates;

b. applying said paint composition to a wall surface and permitting the paint composition to dry, with the particulate magnetically permeable particles being distributed throughout the dried paint composition;

c. providing a rust inhibitor in said paint composition, and subsequent to application and drying of said paint composition on a wall surface, a second coating of a waterbase paint is applied over the paint composition and permitted to dry, with the rust inhibitor in the paint composition preventing action of the second coat of paint causing rust in the particulate material, whereby an object having magnetic properties can be mounted to said wall surface and adhere thereto by interaction with the magnetically permeable particles in the paint composition.

8. The process as recited in claim 7, wherein said binder comprises vinyl acrylic co-polymers and said thickening agent is selected from the groups consisting of synthetic smectite clay, cellulose compositions, acrylic polymers and combinations thereof.

9. The process as recited in claim 7, wherein said rust inhibitor is selected from a group consisting of sodium benzoate and sodium nitrate.

* * * * *